United States Patent

Ohshita et al.

Patent Number: 5,577,322
Date of Patent: Nov. 26, 1996

[54] PROCESS OF ASSEMBLING ELECTROMAGNETIC VALVE

[75] Inventors: Kouji Ohshita, Toyota; Akifumi Tamaoki, Nishikamo-gun, both of Japan

[73] Assignee: Toyota Jidosha Kabushiki Kaisha, Aichi, Japan

[21] Appl. No.: 376,833

[22] Filed: Jan. 23, 1995

[30] Foreign Application Priority Data

Feb. 15, 1994 [JP] Japan .................................. 6-018131
Nov. 22, 1994 [JP] Japan .................................. 6-288146

[51] Int. Cl.$^6$ ........................... B21K 1/24; B60T 8/36; F16K 31/06
[52] U.S. Cl. .................. 29/890.13; 29/890.124; 251/129.15; 303/119.2; 303/901
[58] Field of Search ............................ 29/602.1, 606, 29/890.122, 890.124, 890.13; 251/129.02, 129.15, 129.21; 303/11, 115.2, 119.1, 119.2, 900, 901

[56] References Cited

U.S. PATENT DOCUMENTS

| | | | |
|---|---|---|---|
| 4,938,451 | 7/1990 | Weaver et al. | 29/890.13 X |
| 5,167,442 | 12/1992 | Alaze et al. | 251/129.02 X |
| 5,267,785 | 12/1993 | Maisch | 303/119.2 |
| 5,333,836 | 8/1994 | Fukuyo et al. | 29/890.13 X |
| 5,335,984 | 8/1994 | Alaze et al. | 303/119.2 |
| 5,364,067 | 11/1994 | Linkner, Jr. | 29/890.13 X |
| 5,445,448 | 8/1995 | Wolff et al. | 303/901 X |

FOREIGN PATENT DOCUMENTS

| | | | |
|---|---|---|---|
| 4234749A | 4/1994 | Germany. | |
| 59075 | 5/1981 | Japan | 29/890.13 |
| 92/05989 | 4/1992 | WIPO. | |

Primary Examiner—Peter Vo
Attorney, Agent, or Firm—Oliff & Berridge

[57] ABSTRACT

A process of assembling an electromagnetic valve in which a gap provided between a core and a plunger can be maintained properly without an increase in a number of parts or deterioration in assembly performance. The electromagnetic valve has a shaft, a valve element, which opens and closes a channel, being provided at an end portion of the shaft; a plunger fixed to another end portion of the shaft at the opposite side of the valve element; a valve seat forming body which is positioned further toward the valve element than the plunger, the valve seat forming body forming a valve seat at which the valve element is set; and a sleeve which provided at a periphery of the plunger, a core which opposes the plunger being fixed to the sleeve, and the sleeve being fixed to a housing by caulking. The process of assembling the electromagnetic valve includes steps of: fixing the core to the sleeve; inserting the plunger, to which the shaft is fixed, into the sleeve; integrally forming a valve unit by inserting the valve seat forming body into the sleeve and fixing the valve seat forming body to the sleeve; and inserting the sleeve of the valve unit into the housing and fixing the sleeve to the housing.

20 Claims, 6 Drawing Sheets

FIG. 6
PRIOR ART

PROCESS OF ASSEMBLING ELECTROMAGNETIC VALVE

BACKGROUND OF THE INVENTION

1. Field of the Invention

The present invention relates to a process of assembling an electromagnetic valve.

2. Description of the Related Art

An anti-lock brake system (ABS) is provided in a brake device of a vehicle in order to prevent locking of the wheels at times of sudden braking. Generally, an ABS is formed by a speed sensor, an ABS computer, an ABS actuator and the like. The ABS actuator includes a plurality of electromagnetic valves, pumps and the like.

Figure 6:
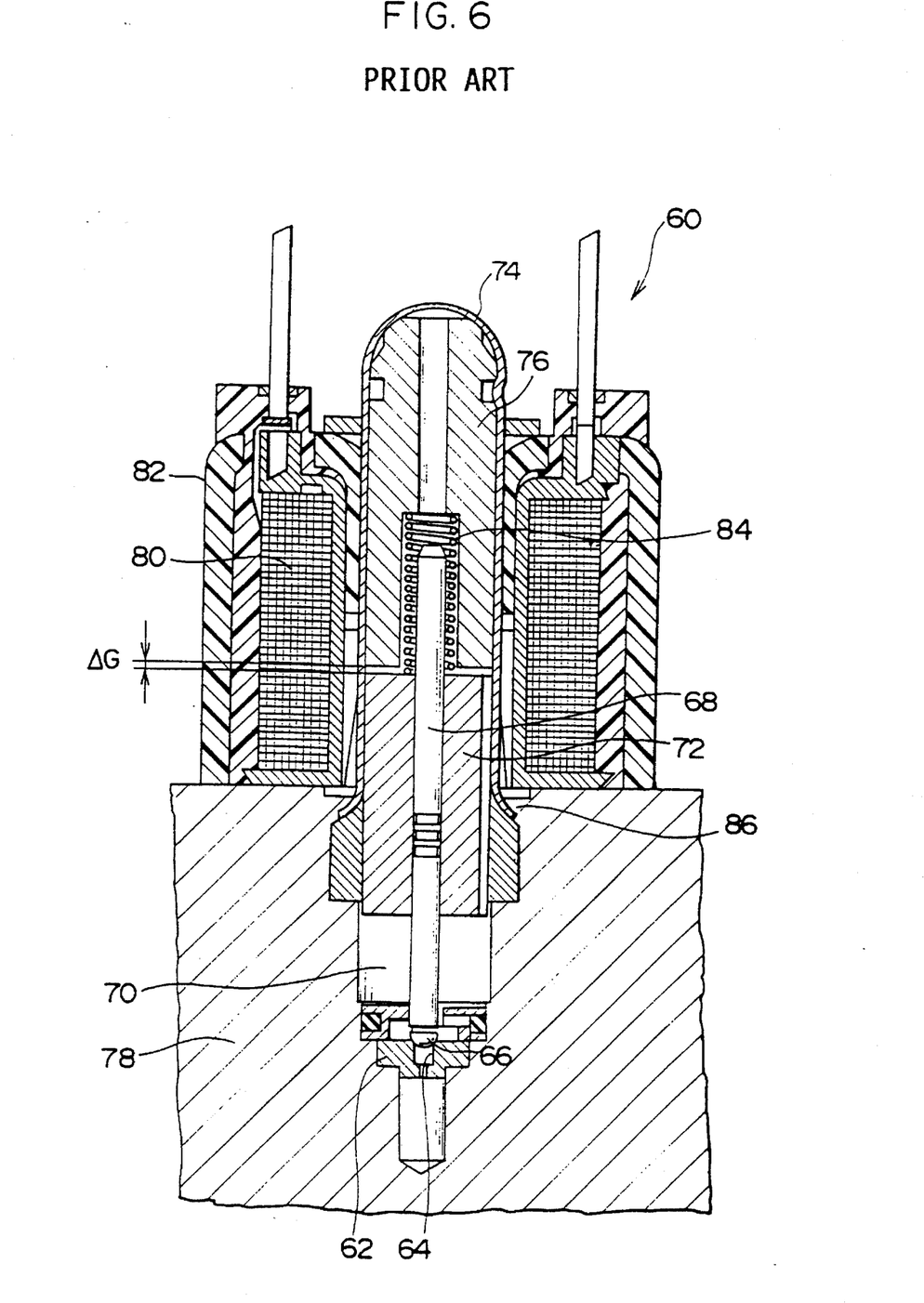
FIG. 6 is a cross-sectional view illustrating a structure of a conventional electromagnetic valve.

An example of a conventional electromagnetic valve provided in an ABS actuator is illustrated in FIG. 6 (International Application Laid-Open No. WO92/05989). In this electromagnetic valve 60, a channel 64 is formed in a seat valve 62. A shaft 68 is provided with a valve element 66 which opens and closes the channel 64. The shaft 68 is supported by a guide 70 so as to be movable. Further, a plunger 72 is fixed to the shaft 68 at the opposite side of the valve element 66. A sleeve 74 is disposed at the periphery of the plunger 72. A core 76 is fixed to the sleeve 74 so as to oppose the plunger 72. The lower end portion of the sleeve 74 is caulked and fixed to a housing 78. A yoke 82 which accommodates a coil 80 is disposed at the periphery of the sleeve 74.

By energizing the coil 80, the plunger 72 is drawn against the urging force of a return spring 84 and moves together with the shaft 68. The valve element 66 moves away from the channel 64 so that the channel 64 is opened.

In the conventional electromagnetic valve 60 having the above-described structure, the respective parts are independently and successively assembled to the housing 78. Namely, the seat valve 62, the guide 70, the plunger 72 together with the shaft 68, and the like are successively assembled in a predetermined hole formed in the housing 78. After the sleeve 74, to which the core 76 is fixed, is made to cover the structure assembled as described above, a peripheral edge portion (caulking portion 86) of the hole is caulked so that the sleeve 74 is fixed to the housing 78. Thereafter, the yoke 82 (coil 80) is made to cover the sleeve 74. In this way, the electromagnetic valve 60 is completed.

However, in the conventional electromagnetic valve 60, because the respective structural parts are successively assembled to the housing 78 as described above, when the sleeve 74 is caulked and fixed to the housing 78, the sleeve 74 together with the core 76 is displaced with respect to the housing 78 due to the movement of the housing 78 which is caused by the caulking. A drawback arises in that it is difficult to determine the accurate attachment position off the sleeve 74. Accordingly, in this case, a gap ΔG which is set appropriately during temporary assembly varies due to fixing the sleeve 74. This drawback becomes marked in cases in which the housing 78 is made of aluminum in order to make the electromagnetic valve 60 more lightweight.

SUMMARY OF THE INVENTION

In view of the aforementioned, an object of the present invention is to provide a process of assembling an electromagnetic valve in which a gap provided between a core and a plunger can be maintained properly without an increase in the number of parts or a deterioration in assembly performance.

In order to achieve the above-described object, the present invention provides a process of assembling an electromagnetic valve which has: a shaft, a valve element, which opens and closes a channel, being provided at an end portion off the shaft; a plunger fixed to the other end portion off the shaft at the opposite side of the valve element; a valve seat forming body which is positioned further toward the valve element than the plunger, the valve seat forming body forming a valve seat at which the valve element is set; and a sleeve which is provided at a periphery of the plunger, a core which opposes the plunger being fixed to the sleeve, the sleeve being fixed to a housing by caulking. The process comprises the steps of: fixing the core to the sleeve; inserting the plunger, to which the shaft is fixed, into the sleeve; integrally forming a valve unit by inserting the valve seat forming body into the sleeve and fixing the valve seat forming body to the sleeve; and inserting the sleeve of the valve unit into the housing and fixing the sleeve to the housing.

In the process of assembling an electromagnetic valve of the present invention, before the sleeve is caulked and fixed to the housing, the sleeve, to which the core is fixed, is fixed and made into an integral unit with the valve seat forming body which forms the valve seat. Thereafter, the sleeve of the integral unit is caulked and fixed to the housing.

Accordingly, if the gap provided between the core and the plunger is appropriately adjusted in advance, even if the sleeve together with the core is disk, laced with respect to the housing due to the movement of the housing when the sleeve is caulked and fixed to the housing, the relative positions of the sleeve (i.e., the core) and the valve forming body (i.e., the plunger) do not vary, and the gap does not vary.

DESCRIPTION OF THE PREFERRED EMBODIMENTS

Figure 1:
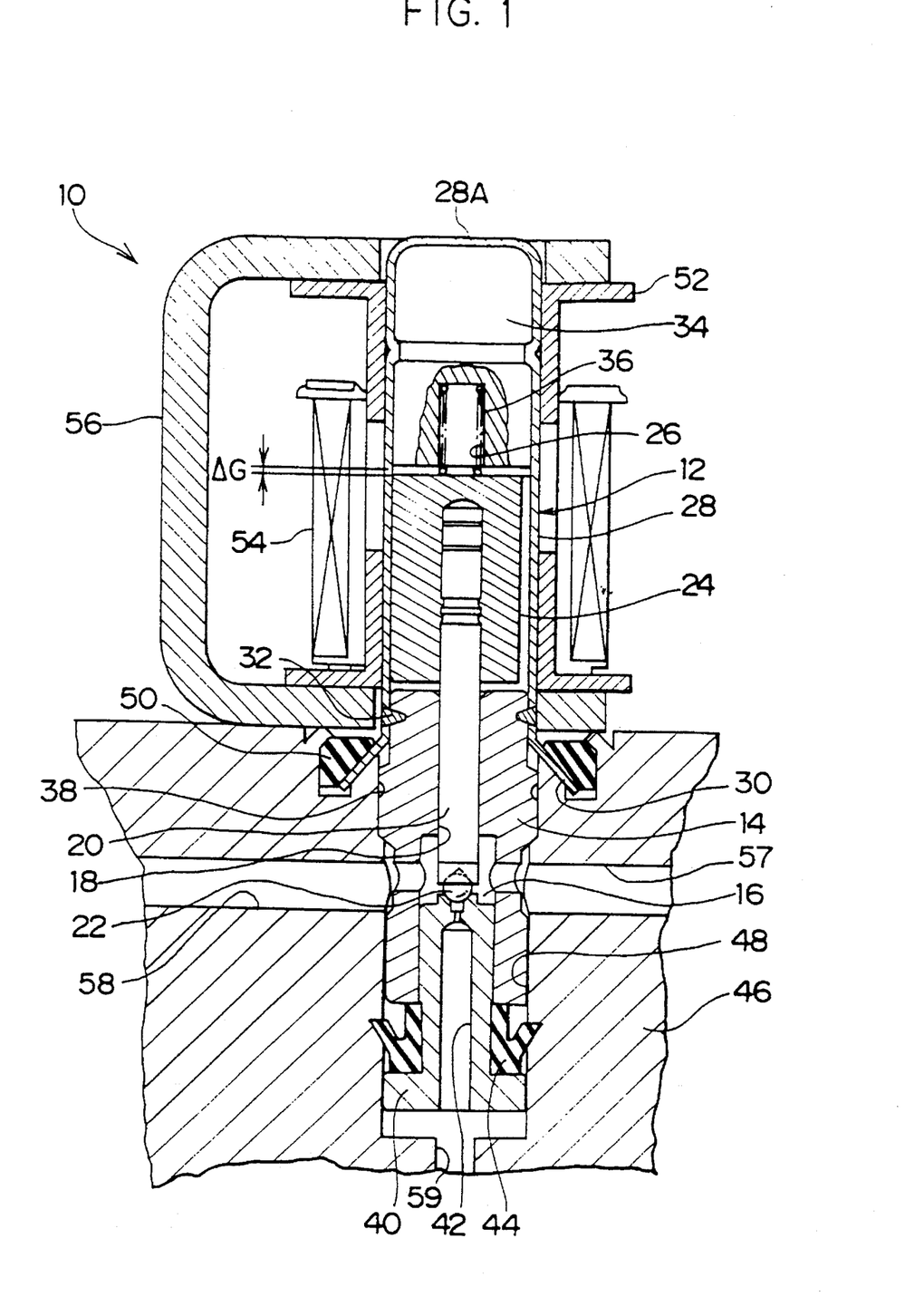
FIG. 1 is a cross-sectional view illustrating a structure of an electromagnetic valve relating to a first embodiment of the present invention.

FIG. 1 is a cross-sectional view illustrating an entire structure of an electromagnetic valve 10 relating to a first embodiment of the present invention.

Figure 2:
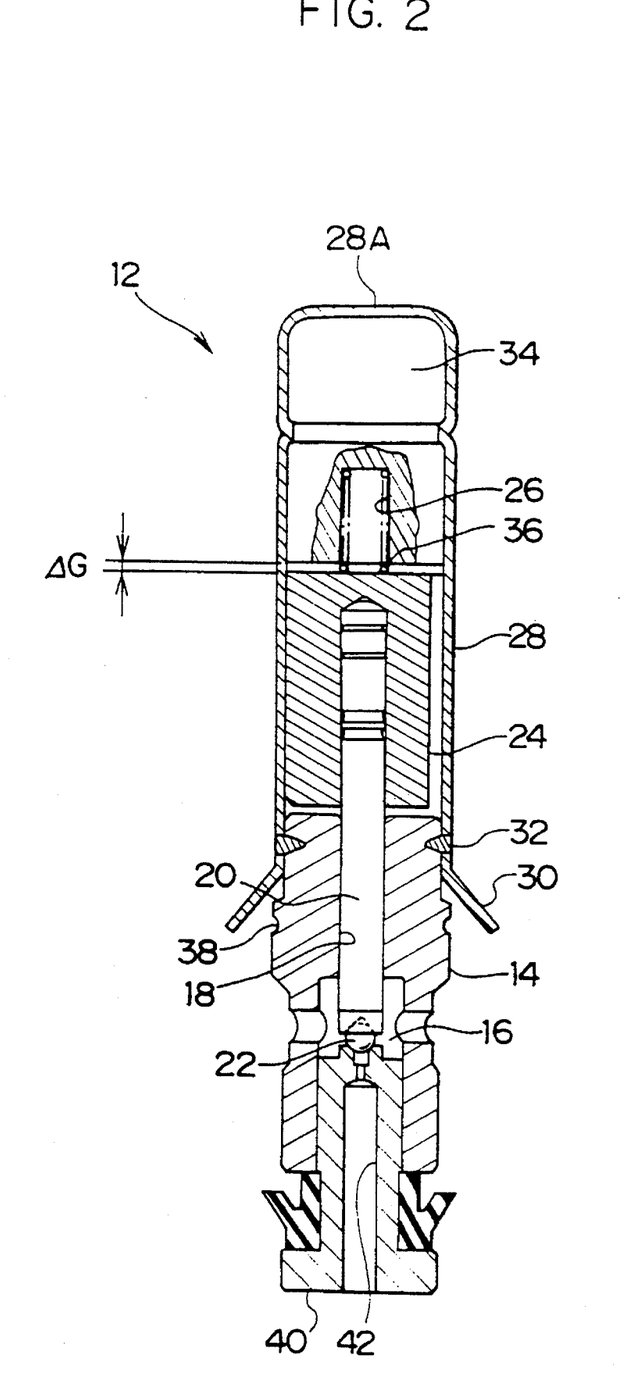
FIG. 2 is a cross-sectional view illustrating a structure of a valve unit of the electromagnetic valve illustrated in FIG. 1.

The electromagnetic valve 10 is housed within an ABS actuator provided in an ABS of a vehicle. The electromagnetic valve 10 is provided with a valve unit 12. FIG. 2 is a cross-sectional view of the valve unit 12. The valve unit 12 includes a guide block 14. The guide block 14 is shaped into a cylindrical block, and a valve chamber 16 is formed at a central portion thereof. A guide hole 18 is formed in the guide block 14 along the longitudinal axis thereof. A shaft 20 is supported at the guide block 14 so as to be movable.

One end portion of the shaft 20 extends to the valve chamber 16, and a spherical valve element 22 is provided at this one end portion. The other end portion of the shaft 20 protrudes out to the exterior of the guide block 14, and a plunger 24 is fixed thereto. Accordingly, the plunger 24 and the shaft 20 always move integrally.

A sleeve 28 is disposed at the periphery of the plunger 24. The sleeve 28 is formed as a substantial cylinder having a top wall 28A. A skirt portion 30 whose diameter is enlarged in a skirt shape is formed at the lower end portion of the sleeve 28. In a state in which the sleeve 28 covers the plunger 24, a welded portion 32 in a vicinity of the skirt portion 30 is integrally fixed to the upper end portion of the guide block 14 by welding. Further, a core 54 is fixed by caulking to the inner side off the sleeve 28 so as to oppose the plunger 28. A return spring 36 is provided in a hole 26 having a bottom which hole 26 is provided in the core 34. Accordingly, the plunger 24, i.e., the shaft 20, is always urged in a direction of moving away from the core 34.

A groove 38 is formed in a portion of the periphery of the guide block 14 which opposes the skirt portion 30 of the sleeve 28.

A seat valve 40, which serves as a valve seat forming body, is press-fit and fixed at the bottom end portion of the guide block 14 (directly beneath the valve chamber 16). Namely, the seat valve 40 is integral with the guide block 14 and is fixed to the sleeve 28. A channel 42 which is coaxial with the shaft 20 is formed at the central axis of the seat valve 40. The upper end opening portion of the seat valve 40 is positioned at the valve chamber 16 and opposes the valve element 22. Accordingly, the valve element 22, which is usually urged by the urging force of the return spring 36 in the direction of the seat valve 40, blocks the channel 42. A predetermined gap ΔG (e.g., 0.30 to 0.35 mm) is provided between the plunger 24 and the core 34.

The seat valve 40 which serves as the valve seat forming body may be formed integrally with the guide block 14 or may be formed as a single part.

A cup seal 44 is mounted to the periphery of the seat valve 40.

As described above, the valve unit 12, which comprises the seat valve 40, the guide block 14, the sleeve 28, the shaft 20, and the plunger 24, is a single unit part. The valve unit 12 is attached to a housing 46 of an ABS actuator. The housing 46 is made of aluminum. The valve unit 12 is inserted into an attachment hole 48 formed in the housing 46. With a back up ring 50 superposed on the skirt portion 30, the valve unit 12 is attached to the housing 46 by the entire periphery being caulked.

A yoke 56 which accommodates an inner yoke 52 and a coil 54 is disposed at the periphery of the valve unit 12 (sleeve 28) which is attached to the housing 46. In this way, by energizing the coil 54, the plunger 24 is drawn against the urging force of the return spring 36 and moves together with the shaft 20. The valve element 22 moves away from the channel 42, and the channel 42 opens.

Oil paths 57, 58 are formed at the attachment hole 48 formed in the housing 46 so as to correspond to the valve chamber 16 of the guide block 14. The oil path 57 communicates with a master cylinder (unillustrated) of a brake device, and the oil path 58 communicates with a wheel cylinder (unillustrated). Further, an oil path 59 is formed at the bottom portion of the attachment hole 48 so as to correspond to the channel 42 of the seat valve 40. The oil path 59 communicates with a reservoir (unillustrated).

Next, operation of the first embodiment will be explained in accordance with the processes of assembling the electromagnetic valve 10.

In the above-described electromagnetic valve 10, first, the core 34 is fixed to the sleeve 28 by caulking. Then, the plunger 24, to which the shaft 20 is fixed, is inserted into the sleeve 28 together with the return spring 36. After the sleeve 28 has been superposed on the guide block 14, welding is effected at the welding portion 32 so that the guide block 14 and the sleeve 28 are fixed. Next, the seat valve 40 provided with the cup seal 44 is press-fit and fixed to the guide block 14. The valve unit 12 is thereby completed.

Thereafter, the sleeve 28 (skirt portion 30) of the valve unit 12 which has been made into a unit is caulked and fixed, together with the back up ring 50, to the housing 46. Then, the yoke 56 accommodating the inner yoke 52 and the coil 54 is attached to the periphery of the valve unit 12 (sleeve 28) which has been attached to the housing 46. In this way, the electromagnetic valve 10 is completed.

In the electromagnetic valve 10 of the first embodiment, the sleeve 28, to which the core 34 is fixed, is fixed integrally with the guide block 14, which together with the plunger 24 supports the shaft 20, so as to form the valve unit 12 before the sleeve 28 is caulked and fixed to the housing 46. Therefore, the gap ΔG provided between the core 34 and the plunger 24 does not vary in the fabrication processes.

Namely, the gap ΔG is unconditionally determined by the press-fit dimension at the time when the seat valve 40 is fixed to the guide block 14. By managing only this dimension (i.e., by managing the valve unit 12), the dimensional errors and welding errors of the respective parts are absorbed and the gap ΔG can be set to a predetermined value. Accordingly, if the press-fit dimension at the time when the seat valve 40 is fixed to the guide block 14 is adjusted appropriately in advance, even if the sleeve 28 is displaced together with the core 34 in the axial direction with respect to the housing 46 due to the movement of the housing 46 at the time the valve unit 12 (sleeve 28) is caulked and fixed to the housing 46, the relative positions of the sleeve 28 (i.e., the core 34) and the guide block 14 (i.e., the plunger 24) do not vary, and the gap ΔG can be reliably maintained at the predetermined value without varying.

Further, in the electromagnetic valve 10 relating to the first embodiment, the entire periphery of the valve unit 12 (sleeve 28) is caulked and fixed with the back up ring 50 superposed on the skirt portion 30. Therefore, concentration of stress on the caulked portions of the housing 46 can be avoided, and even if, for example, the housing 46 is formed of aluminum, the sealability can be maintained reliably.

Further, in the electromagnetic valve 10, because the groove 38 is provided in the guide block 14 directly beneath the skirt portion 30, when the valve unit 12 (sleeve 28) is caulked to the housing 46, the groove 38 cuts into the portions of the moving housing 46 so that not only the sleeve 28, but the guide block 14 as well is directly fixed to the housing 46. Accordingly, the application of load on the portion at which the sleeve 28 and the guide block 14 are fixed, i.e., the welded portion 32, is prevented, and the durability of the electromagnetic valve 10 improves.

In the first embodiment, the sleeve 28 is superposed on the guide block 14, and welding is effected at the welded portion 32. Thereafter, the seat valve 40 is press-fit and fixed to the guide block 14. However, the present embodiment is not limited to the same. The guide block 14 may be fixed to the sleeve 28 after the seat valve 40 is press-fit and fixed to the guide block 14. In this case, the gap ΔG can be set and managed appropriately in the step in which the guide block 14 and the sleeve 28 are superposed and positioned. Accordingly, if the positioning at the time when the guide block 14, together with the seat valve 40, is fixed to the sleeve 28 is adjusted appropriately in advance, even if the sleeve 28 and the core 34 are displaced in the axial direction with respect to the housing 46 due to the movement of the housing 46 at the time when the valve unit 12 (sleeve 28) is caulked and fixed to the housing 46, the relative positions of the sleeve 28 (i.e., the core 34) and the guide block 14 (i.e., the plunger 24) do not vary, and the gap $\Delta G$ is reliably maintained at the predetermined value without varying.

Next, a second embodiment of the present invention will be described. Parts which are basically the same as those of the first embodiment are denoted by the same reference numerals as in the first embodiment, and description of such parts is omitted.

Figure 3:
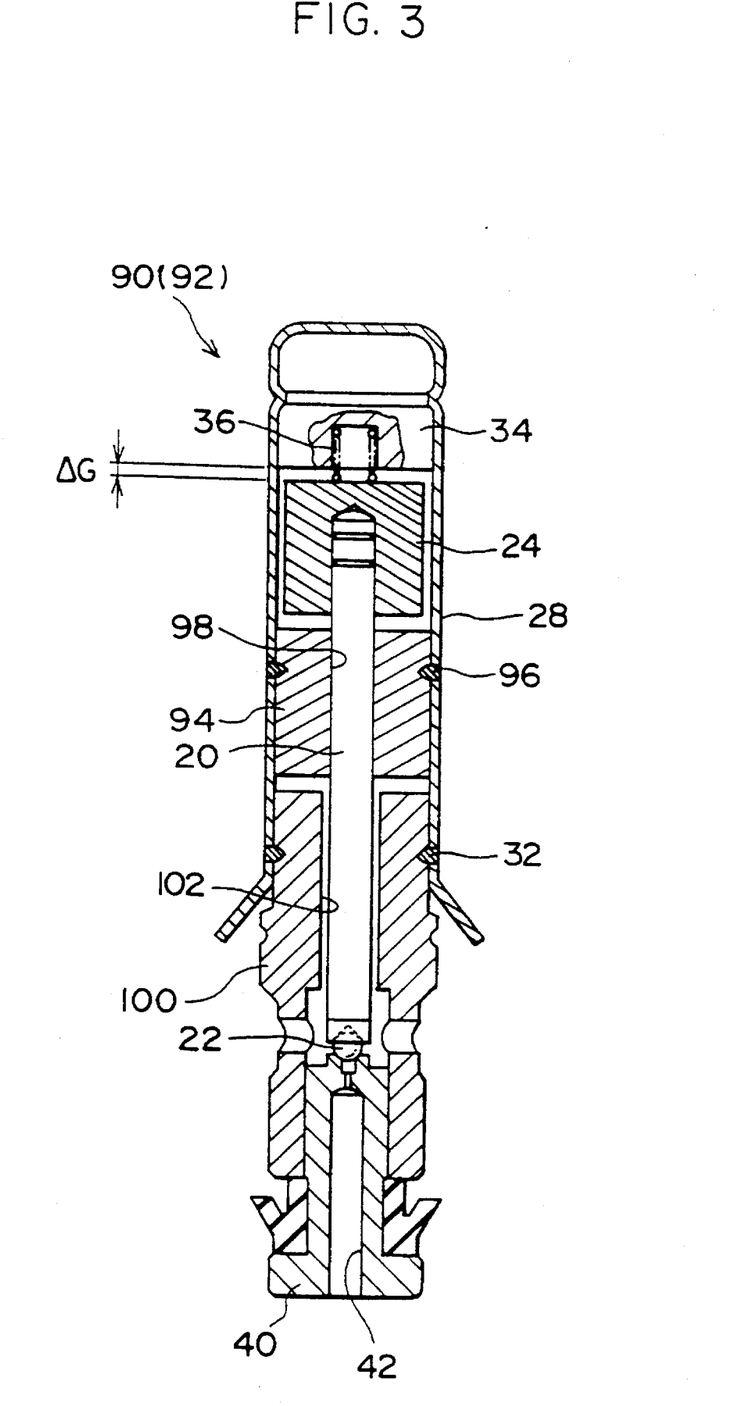
FIG. 3 is a cross-sectional view illustrating a structure of a valve unit of an electromagnetic valve relating to a second embodiment of the present invention.

FIG. 3 is a cross sectional view of the structure of a valve unit 92 of an electromagnetic valve 90 relating to the second embodiment of the present invention.

At The valve unit 92 of the electromagnetic valve 90, a shaft guide 94 is disposed directly beneath the plunger 24. The shaft guide 94 is fixed integrally with the sleeve 28 by welding at a welding portion 96. A guide hole 98 is formed at the longitudinal axis of the shaft guide 94. The shaft 20 is supported at the shaft guide 94 so as to be movable. Further, a seat block fixing portion 100 is disposed directly under the shaft guide 94. A through-hole 102 is formed in the seat block fixing portion 100 along the longitudinal axis thereof. The shaft 20 penetrates through the through-hole 102. Namely, in the first embodiment, the guide block 14, which functions to guide the shaft 20, and the seat valve 40, which serves as the valve seat forming body, are formed integrally and are welded and fixed to the sleeve 28. However, the valve unit 92 of the electromagnetic valve 90 relating to the second embodiment is different in that the guide block 14 of the first embodiment is divided into the seat block fixing portion 100 and the shaft guide 94 in the second embodiment. Namely, the shaft guide 94 only functions to guide the shaft 20. The seat block fixing portion 100 is provided with channels 104, 106, which communicate with the valve chamber 16, and serves to fix the seat block 40 to the sleeve 28.

As described above, in the electromagnetic valve 90 relating to the second embodiment, the valve unit 92 which is formed by the seat valve 40, the seat block fixing portion 100, the sleeve 28, the shaft guide 94, the shaft 20, the plunger 24 and the like, is a single unit part. The valve unit 92 is attached to the housing 46 of an ABS actuator.

In the electromagnetic valve 90 structured as described above, the plunger 24, to which the shaft 20 is fixed, is inserted together with the return spring 36 into the sleeve 28 to which the core 24 is caulked and fixed. Thereafter, the shaft guide 94 is inserted into the sleeve 28, and welding is effected at the welding portion 96 so that the shaft guide 94 and the sleeve 28 are fixed. Then, after the seat block fixing portion 100 and the sleeve 28 are superposed, welding is effected at the welding portion 32 so that the seat block fixing portion 100 and the sleeve 28 are fixed. Next, the seat valve 40 provided with the cup seal 44 is press-fit and fixed to the seat block fixing portion 100. The valve unit 92 is thereby completed.

Thereafter, in the same way as in the first embodiment, the valve unit 92 which has been made into a unit is, together with the back up ring 50, caulked and fixed to the housing 46. The yoke 56 accommodating the inner yoke 52 and the coil 54 is attached, and the electromagnetic valve 90 is thereby completed.

In this way, in the electromagnetic valve 90 relating to the second embodiment, before the sleeve 28 is caulked and fixed to the housing 46, the plunger 24 and the shaft 20 are accommodated within the sleeve 28, to which the core 34 is fixed, and the seat block fixing portion 100 and the seat valve 40 are fixed integrally so as to form the valve unit 92. Therefore, the gap $\Delta G$ provided between the core 34 and the plunger 24 does not vary during the assembling process.

Namely, the gap $\Delta G$ is unconditionally determined by the press-flit dimension at the time when the seat valve 40 is fixed to the seat block fixing portion 100. By managing only this dimension (i.e., by managing the valve unit 92), the dimensional errors and welding errors of the respective parts are absorbed and the gap $\Delta G$ can be set to a predetermined value. Accordingly, if the press-fit dimension at the time when the seat valve 40 is fixed to the seat block fixing portion 100 is adjusted appropriately in advance, even if the sleeve 28 is displaced together with the core 34 in the axial direction with respect to the housing 46 due to the movement of the housing 46 at the time the valve unit 92 (sleeve 28) is caulked and fixed to the housing 46, the relative positions of the sleeve 28 (i.e., the core 34) and the seat block fixing portion 100 (i.e., the plunger 24) do not vary, and the gap $\Delta G$ can be reliably maintained at the predetermined value without varying.

In the second embodiment as well, the seat block fixing portion 100 and the sleeve 28 are superposed and welding is effected at the welding portion 32 so that the seat block fixing portion 100 and the sleeve 28 are fixed. Thereafter, the seat valve 40 is press-fit and fixed to the seat block fixing portion 100. However, the present embodiment is not limited to the same. The seat block fixing portion 100 may be fixed to the sleeve 28 after the seat valve 40 is press-fit and fixed to the seat block fixing portion 100. In this case, the gap $\Delta G$ can be appropriately set and managed in the step of superposing and positioning the seat block fixing portion 100 and the sleeve 28. Accordingly, if the positioning at the time when the seat block fixing portion 100 is fixed together with the seat valve 40 to the sleeve 28 is appropriately adjusted in advance, even if the sleeve 28 together with the core 34 are displaced in the axial direction with respect to the housing 46 due to the movement of the housing at the time when the valve unit 92 (sleeve 28) is caulked and fixed to the housing 46, the relative positions of the sleeve 28 (i.e., the core 34) and the seat block fixing portion 100 (i.e., the plunger 24) do not vary, and the gap $\Delta G$ is reliably maintained at the predetermined value without varying.

In the second embodiment, the order for welding and fixing the shaft guide 94 to the sleeve 28 at the welding portion 96 can be set appropriately. However, it is preferable that the shaft guide 94 is welded and fixed to the sleeve 28 before the seat block fixing portion 100 is fixed to the sleeve 28.

Further, in the second embodiment, explanation is given of a case in which the shaft guide 94 is welded and fixed to the sleeve 28 at the welding portion 98. However, the present embodiment is not limited to the same, and the shaft guide 94 may be fixed to the sleeve 28 by press-fitting.

In contrast with the valve unit 92 of the second embodiment, the valve unit 12 (guide block 14) of the previously-described first embodiment can be considered to be a structure in which the shaft guide portion, which supports the shaft 20 such that the shaft 20 is movable, and the fixing portion, which fixes the seat valve 40 serving as the valve seat forming portion to the sleeve 28, are provided integrally. In both the first and the second embodiments, the gap ΔG can reliably be maintained at a predetermined value.

Figure 4:
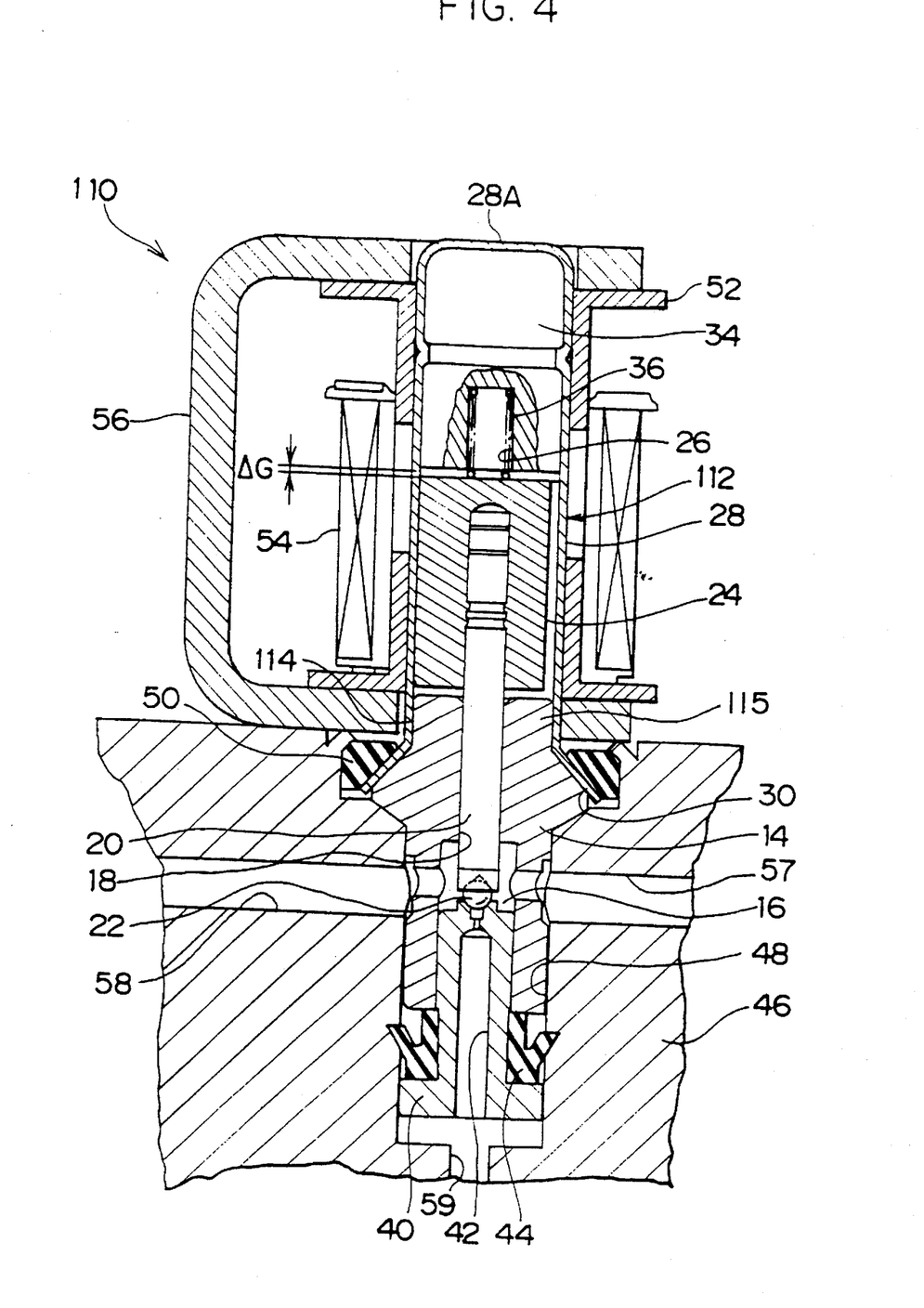
FIG. 4 is a cross-sectional view illustrating a structure of an electromagnetic valve relating to a third embodiment of the present invention.

In FIG. 4, the entire structure of an electromagnetic valve 110 relating to a third embodiment of the present invention is illustrated in cross section.

Figure 5:
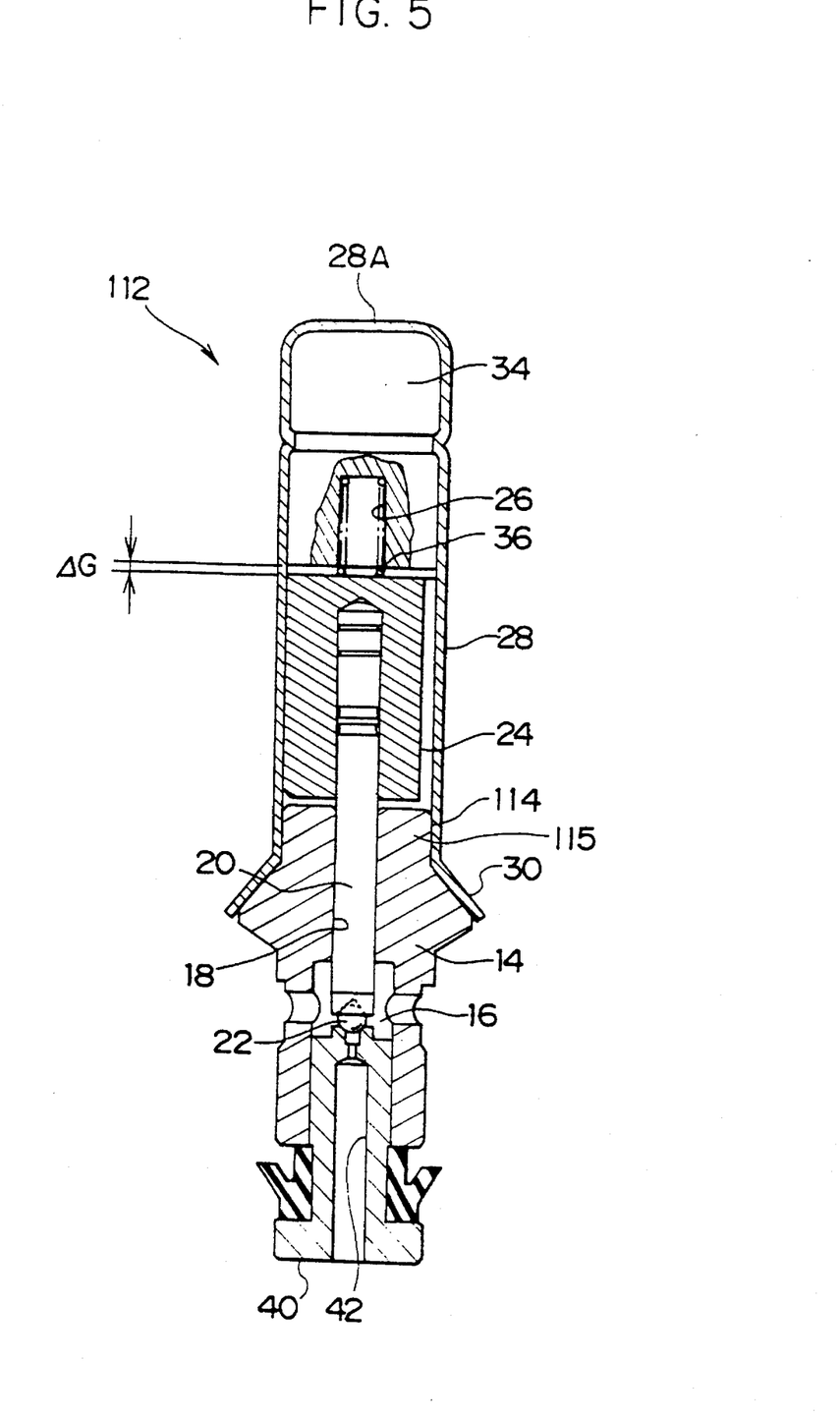
FIG. 5 is a cross-sectional view illustrating a structure of a valve unit of the electromagnetic valve illustrated in FIG. 4.

The electromagnetic valve 110 is provided with a valve unit 112. FIG. 5 is a cross-sectional view of the valve unit 112. The valve unit 112 is structured basically the same as the valve unit 12 relating to the first embodiment, and is provided with the guide block 14. The guide block 14 is shaped into a cylindrical block, and the valve chamber 16 is formed in the central portion thereof. Further, the guide hole 18 is formed in the guide block 14 along the longitudinal axis. The shaft 20 is supported at the guide block 14 so as to be movable.

One end portion of the shaft 20 extends to the valve chamber 16, and a spherical valve element 22 is formed at this one end portion. The other end portion of the shaft 20 protrudes out to the exterior of the guide block 14, and the plunger 24 is fixed thereto. Accordingly, the plunger 24 and the shaft 20 always move integrally.

A sleeve 28 is disposed at the periphery of the plunger 24. The sleeve 28 is formed as a substantial cylinder having a top wall 28A. A skirt portion 30 whose diameter is enlarged in a skirt shape is formed at the lower end portion of the sleeve 28. In a state in which the sleeve 28 covers the plunger 24, an upper end portion 115 of the guide block 14 is press-fit at a press-fit portion 114 in a vicinity of the skirt portion 30 so that the sleeve 28 and the guide block 14 are fixed integrally. Further, the core 34 is caulked and fixed at the inner side of the sleeve 28 so as to oppose the plunger 24. The return spring 36 is provided within the hole 26 having a bottom which hole 26 is provided in the core 34. In this way, the plunger 24, i.e., the shaft 20, is always urged in a direction of moving away from the core 34.

The seat valve 40 serving as the valve seat forming body is press-fit and fixed to the bottom end portion of the guide block 14 (directly beneath the valve chamber 16). The seat valve 40 is integral with the guide block 14, and is fixed to the sleeve 28. The channel 42 which is coaxial with the shaft 20 is formed at the central axis of the seat valve 40. The upper end opening portion of the channel 42 is positioned at the valve chamber 16 so as to oppose the valve element 22. Accordingly, the valve element 22, which is usually urged in the direction of the seat valve 40 due to the urging force of the return spring 36, blocks the channel 42. A predetermined gap ΔG is provided between the plunger 24 and the core 34.

The cup seal 44 is mounted to the periphery of the seat valve 40.

As described above, in the electromagnetic valve 110 relating to the third embodiment, the valve unit 112 comprises the seat valve 40, the guide block 14, the sleeve 28, the shaft 20, and the plunger 24, and is a single unit part. The valve unit 112 is attached to the housing 46 of an ABS actuator. The housing 46 is made of aluminum. The valve unit 112 is inserted into the mounting hole 48 formed in the housing 46. In a state in which the back up ring 50 is superposed on the skirt portion 30, the entire periphery of the valve unit 112 is caulked and attached.

The yoke 56 which accommodates the inner yoke 52 and the coil 54 is disposed at the periphery of the valve unit 112 (sleeve 28) which is attached to the housing 46. In this way, by energizing the coil 54, the plunger 24 is drawn against the urging force of the return spring 36 and moves together with the shaft 20. The valve element 22 moves away from the channel 42, and the channel 42 is opened.

Further, the oil paths 57, 58 are formed in the attachment hole 48 formed in the housing 46 so as to correspond to the valve chamber 16 of the guide block 14. The oil path 59 is formed in the bottom portion of the attachment hole 48 so as to correspond to the channel 42 of the seat valve 40.

Next, operation of the third embodiment will be described in accordance with the processes of assembling the electromagnetic valve 110.

At the electromagnetic valve 110 having the above-described structure, first, the core 34 is fixed to the sleeve 28 by caulking. Next, the plunger 24, to which the shaft 20 is fixed, is inserted together with the return spring 36 into the sleeve 28. After the guide block 14 and the sleeve 28 are superposed, the guide block 14 is press-fit at the press-fit portion 114 so as to be fixed. Then, the seat valve 40 which is provided with the cup seal 44 is press-fit and fixed to the guide block 14. The valve unit 112 is thereby completed.

Thereafter, the sleeve 28 (skirt portion 30) of the valve unit 112 which has been made into a unit is, together with the back up ring 50, caulked and fixed to the housing 46. Then, the yoke 56 which accommodates the inner yoke 52 and the coil 54 is attached to the periphery off the valve unit 12 (sleeve 28) which is attached to the housing 46. In this way, the electromagnetic valve 110 is completed.

In the electromagnetic valve 110 relating to the third embodiment, the sleeve 28, to which the core 34 is fixed, is fixed integrally with the guide block 14, which together with the plunger 24 supports the shaft 20, so as to form the valve unit 112 before the sleeve 28 is caulked and fixed to the housing 46. Therefore, the gap ΔG provided between the core 34 and the plunger 24 does not vary in the fabrication process.

Namely, the gap ΔG is unconditionally determined by the press-fit dimension at the time when the seat valve 40 is fixed to the guide block 14. By managing only this dimension (i.e., by managing the valve unit 112), the dimensional errors of the respective parts are absorbed and the gap ΔG can be set to a predetermined value. Accordingly, if the press-fit dimension at the time when the seat valve 40 is fixed to the guide block 14 is adjusted appropriately in advance, even if the sleeve 28 is displaced together with the core 34 in the axial direction with respect to the housing 46 due to the movement of the housing 46 at the time the valve unit 112 (sleeve 28) is caulked and fixed to the housing 46, the relative positions off the sleeve 28 (i.e., the core 54) and the guide block 14 (i.e., the plunger 24) do not vary, and the gap ΔG can be reliably maintained at the predetermined value without varying.

In the electromagnetic valve 110 relating to the third embodiment, the entire periphery of the valve unit 112 (sleeve 28) is caulked and fixed in a state in which the back up ring 50 is superposed on the skirt portion 30. Therefore, the concentration of stress on the caulked portions of the housing 46 is avoided, and even if, for example, the housing 46 is formed of aluminum, the sealability can be reliably maintained.

In the above-described embodiments, the electromagnetic valve 10 (the valve unit 12), the electromagnetic valve 90 (the valve unit 92) and the electromagnetic valve 110 (the valve unit 112) are attached to the housing 46 which is made of aluminum. However, the present invention is not limited to the same, and the electromagnetic valve of the present invention is applicable to housings formed of materials other than aluminum.

The above description of the embodiments includes the normally-closed electromagnetic valves 10, 90, 110 in which the valve element 22 usually closes the channel 42. However, the present invention is not limited to the same, and is also applicable to normally-open electromagnetic valves.

In the above embodiments, the electromagnetic valves 10, 90, 110 are respectively incorporated in an ABS actuator provided at the ABS of a vehicle. However, the present invention is not limited to the same, and is also applicable to electromagnetic valves other than those used for ABS actuators.

The present invention having the above-described structure achieves a superior effect in that the gap provided between the core and the plunger can be maintained appropriately without an increase in the number of parts or a deterioration in assembly performance.

What is claimed is:

1. A process of assembling an electromagnetic valve which has: a shaft, a valve element, which opens and closes a channel, being provided at an end portion of said shaft; a plunger fixed to the other end portion of said shaft at the opposite side of said valve element; a valve seat forming body which is positioned further toward said valve element than said plunger, said valve seat forming body forming a valve seat at which said valve element is set; and a sleeve which is provided at a periphery of said plunger, a core which opposes said plunger being fixed to said sleeve, said sleeve being fixed to a housing by caulking, said process comprising the steps of:

fixing said core to said sleeve;

inserting said plunger, to which said shaft is fixed, into said sleeve;

integrally forming a valve unit by inserting said valve seat forming body into said sleeve and fixing said valve seat forming body to said sleeve; and inserting said sleeve of said valve unit into said housing and fixing said sleeve to said housing.

2. A process of assembling an electromagnetic valve according to claim 1, wherein said core is fixed to said sleeve by caulking.

3. A process of assembling an electromagnetic valve according to claim 1, wherein said valve seat forming body is formed by inserting a cylindrical seat valve into a guide block, which is shaped into a cylindrical block and has a valve seat in a lower central portion thereof, from a bottom surface of said guide block, and by fixing said seat valve to said guide block.

4. A process of assembling an electromagnetic valve according to claim 3, wherein said valve seat forming body is inserted into said sleeve and is fixed to said sleeve after said valve seat forming body is formed by inserting said seat valve into said guide block and by fixing said seat valve to said guide block.

5. A process of assembling an electromagnetic valve according to claim 3, wherein when said seat valve is inserted into said guide block, a cup seal for sealing a space between said housing and said valve seat forming body is installed at said seat valve.

6. A process of assembling an electromagnetic valve according to claim 1, wherein a funnel-shaped skirt portion is provided at a lower end portion of said sleeve, and a back up ring is fit closely to an outer peripheral surface of said skirt portion, and said skirt portion and said back up ring are caulked and fixed to said housing.

7. A process of assembling an electromagnetic valve according to claim 6, wherein a groove is provided in a surface of said guide block beneath said skirt portion of said sleeve, along the entire periphery of the surface.

8. A process of assembling an electromagnetic valve formed by: a guide block shaped into a cylindrical block and having a valve chamber; a shaft supported at said guide block so as to be movable; a plunger fixed to said shaft; a sleeve shaped into substantially cylindrical and provided at a periphery of said plunger; a core provided at an inner side of said sleeve so as to oppose said plunger; a return spring provided at an inner portion of said core and always urging said shaft in a direction of moving away from said core; and a seat valve which is press-fit and fixed to an end portion of said guide block at the opposite side of an end portion of said guide block at which said plunger is positioned, said process comprising the steps of:

fixing said core to said sleeve;

inserting said plunger, to which said shaft is fixed, into said sleeve together with said return spring;

forming a valve unit by inserting said guide block into said sleeve and fixing said guide block to said sleeve;

caulking and fixing said sleeve of said valve unit to a housing; and attaching a yoke which accommodates an inner yoke and a coil to a periphery of said valve unit attached to said housing.

9. A process of assembling an electromagnetic valve according to claim 8, wherein said guide block and said seat valve are formed integrally.

10. A process of assembling an electromagnetic valve according to claim 9, wherein said valve seat forming body is inserted into said sleeve and is fixed to said sleeve after said valve seat forming body is formed by inserting said seat valve into said guide block and by fixing said seat valve to said guide block.

11. A process of assembling an electromagnetic valve according to claim 8, wherein when said seat valve is inserted into said guide block, a cup seal for sealing a space between said housing and said valve seat forming body is installed at said seat valve.

12. A process of assembling an electromagnetic valve according to claim 8, wherein a funnel-shaped skirt portion is provided at a lower end portion of said sleeve, and a back up ring is fit closely to an outer peripheral surface of said skirt portion, and said skirt portion and said back up ring are caulked and fixed to said housing.

13. A process of assembling an electromagnetic valve according to claim 12, wherein a groove is provided in a surface of said guide block beneath said skirt portion of said sleeve, along the entire periphery of the surface.

14. A process of assembling an electromagnetic valve according to claim 8, wherein said guide block is press-fit and fixed to said sleeve.

15. A process of assembling an electromagnetic valve formed by: a seat block fixing portion shaped into a cylindrical block and having a valve chamber; a shaft guide shaped into a cylindrical block and provided above said seat block; a shaft supported at said shaft guide so as to be movable; a plunger fixed to said shaft; a sleeve formed in a substantially cylindrical shape and provided at a periphery of said plunger; a core provided at an inner side of said sleeve so as to oppose said plunger; a return spring provided at an inner portion of said core and always urging said shaft in a direction of moving away from said core; and a seat valve which is press-fit and fixed to an end portion of said seat block fixing portion at the opposite side of an end portion of said seat block fixing portion at which said plunger is positioned, said process comprising the steps of:

fixing said core to said sleeve;

inserting said plunger, to which said shaft is fixed, into said sleeve together with said return spring;

fixing said shaft guide to said sleeve;

forming a valve unit by fixing said seat block fixing portion to said sleeve after said seat block fixing portion has been inserted into said sleeve;

caulking and fixing said sleeve of said valve unit, together with a back up ring, to a housing; and attaching a yoke which accommodates an inner yoke and a coil to a periphery of said valve unit attached to said housing.

16. A process of assembling an electromagnetic valve according to claim 15, wherein said shaft guide and said seat valve fixing portion are fixed to said sleeve by welding.

17. A process of assembling an electromagnetic valve according to claim 16, wherein said valve seat forming body is inserted into said sleeve and is fixed to said sleeve after said valve seat forming body is formed by inserting said seat valve into said seat block fixing portion and by fixing said seat valve to said seat block fixing portion.

18. A process of assembling an electromagnetic valve according to claim 15, wherein when said seat valve is inserted into said seat block fixing portion, a cup seal for sealing a space between said housing and said valve seat forming body is installed at said seat valve.

19. A process of assembling an electromagnetic valve according to claim 15, wherein a funnel-shaped skirt portion is provided at a lower end portion of said sleeve, and a back up ring is fit closely to an outer peripheral surface of said skirt portion, and said skirt portion and said back up ring are caulked and fixed to said housing.

20. A process of assembling an electromagnetic valve according to claim 19, wherein a groove is provided in a surface of said guide block beneath said skirt portion of said sleeve, along the entire periphery of the surface.

* * * * *